United States Patent [19]

Higashiyama et al.

[11] 4,383,515
[45] May 17, 1983

[54] ELECTRONIC FUEL INJECTION CONTROL SYSTEM FOR AN INTERNAL COMBUSTION ENGINE

[75] Inventors: Kazuhiro Higashiyama, Atsugi; Katsumi Hosoya, Yokohama; Shyunichi Kadowaki; Tsuneomi Yano, both of Tokyo, all of Japan

[73] Assignee: Nissan Motor Company, Limited, Yokohama, Japan

[21] Appl. No.: 244,227

[22] Filed: Mar. 16, 1981

[30] Foreign Application Priority Data

Mar. 18, 1980 [JP] Japan ............................. 55-34392

[51] Int. Cl.³ ............... F01N 3/15; F02M 51/00; F02D 5/00
[52] U.S. Cl. .................. 123/489; 123/478; 123/480; 60/276
[58] Field of Search ............. 123/489, 478, 480, 484, 123/440; 60/276, 285

[56] References Cited

U.S. PATENT DOCUMENTS

| | | | |
|---|---|---|---|
| 4,201,161 | 5/1980 | Sasayama et al. | 123/492 |
| 4,245,605 | 1/1981 | Rice et al. | 123/492 |
| 4,257,377 | 3/1981 | Kinngawa et al. | 123/492 |
| 4,263,782 | 4/1981 | Matsumoto et al. | 123/489 |
| 4,274,373 | 6/1981 | Sugasawn et al. | 60/285 |
| 4,274,381 | 6/1981 | Abo | 123/489 |
| 4,276,600 | 6/1981 | Hartford et al. | 123/489 |
| 4,310,888 | 1/1982 | Furuhashi et al. | 123/491 |

Primary Examiner—Raymond A. Nelli
Attorney, Agent, or Firm—Schwartz, Jeffery, Schwaab, Mack, Blumenthal & Koch

[57] ABSTRACT

A fuel injection control system that controls the quantity of injected fuel for an internal combustion engine of the type such as a V-8 engine is disclosed. Such fuel injection control system first calculates a basic amount of fuel to be injected per engine revolution $T_p$ ($T_p = Q/N \times$ Constant Q: intake air flow rate N: engine revolution speed, e.g., rpm), then calculates correction coefficients (COEF, $\alpha_L$ and $\alpha_R$) on a basis of other various engine operating parameters (e.g., cooling water temperature) and the air-fuel mixture ratio of each bank of cylinders as sensed by exhaust gas detectors and combines either of their numerical results with the numerical result $T_p$ to obtain a pulse width representing an amount of fuel per revolution $T_i$, and lastly opens either or both groups of fuel injectors whereby when the intake air flow rate Q is more than a predetermined value $Q_o$, the fuel injectors of both groups are simultaneously opened to inject the fuel during an interval determined by $T_i = \frac{1}{2} \times T_p \times$ COEF in synchronism with one half of engine rotation; when Q is less than $Q_o$, the fuel injectors of either group are alternatingly opened to inject the fuel during an interval determined by $T_i = T_p \times$ COEF $\times (\alpha_L$ or $\alpha_R)$.

23 Claims, 7 Drawing Figures

ELECTRONIC FUEL INJECTION CONTROL SYSTEM FOR AN INTERNAL COMBUSTION ENGINE

BACKGROUND OF THE INVENTION

(1) Field of the Invention

The present invention relates to an electronic fuel injection control system for an internal combustion engine, and more specifically to an electronic fuel injection control system using a single control unit that controls the quantity of injected fuel for an internal combustion engine having a plurality of cylinders arranged in two banks and having two corresponding exhaust manifolds of the type such as in a V-8 engine.

(2) Description of the Prior Art

With rapid developments in electronic technology in recent years, electronic engine control systems using microcomputers have been developed for carrying out fuel injection control, spark timing control, EGR (Exhaust Gas Recirculation) control, idling speed control, and so forth in a unified fashion.

For example, in the case of a fuel injection control system for an in-line six-cylinder engine, for each revolution of the engine, before the fuel injectors are actuated to inject fuel, a microcomputer of a control unit performs an arithmetic operation to calculate a basic fuel injection pulse width (a basic amount of injected fuel per engine speed) $T_p$ which is proportional to an intake air flow quantity with respect to engine speed ($T_p = Q/N$ x Constant, where Q represents the intake air flow quantity and N represents the engine speed).

Next, a feedback signal from an exhaust gas sensor, (e.g., an oxygen sensor which senses and signals the concentration of oxygen in the exhaust gas from the engine to obtain an air-fuel mixture ratio of the fuel supplied to the engine) is inputted to the microcomputer where a correction coefficient $\alpha$ is calculated to correct the air-fuel mixture ratio to a stoichiometric air-fuel mixture ratio. The basic fuel injection pulse width $T_p$ is multiplied by other correction coefficients COEF and the calculated result $\alpha$ to calculate the fuel injection time $T_i$. The calculated value $T_i$ is then set into the injection time register.

The start of injection for the in-line six cylinder engine of the present example is adapted to synchronize with a 360° signal produced by a pulse signal from a crank angle sensor comprising for example three magnetic heads and a waveform shaper for outputting a pulse each time the crankshaft rotates, in the above example, through 120°. Using the pulse signals, a 360° signal representing a single engine rotation is produced by means of a divider. Simultaneously, a counter starts counting the pulses generated during a fixed time interval and a microcomputer compares the counted value with the value in an injection time register of the control unit and stops the injection when the two values coincide.

Consequently, one fuel injection per revolution of the engine can be performed having the proper fuel injection time duration depending on the period of time set in the injection time register. The fuel injection pulse signal, whose width corresponds to the fuel injection time, is respectively fed to a power transistor connected to a solenoid associated with a fuel injector. As the transistors are turned on and off, current flows through each solenoid in turn and the associated fuel injector valve is opened to distribute a fine spray of fuel into the corresponding engine combustion chamber.

When a similar system is applied to a V-8 engine, whose cylinders are arranged in two opposing banks of four cylinders, the intake and exhaust manifold systems are branched into two systems corresponding to the two cylinder banks respectively so that the oxygen sensors are also positioned in each of the two exhaust manifolds. These dual systems will hereinafter be referred to as right and left systems, e.g., right cylinder banks, left cylinder banks, etc.

Since the correction value for the air-fuel mixture ratio against a stoichiometric air-fuel mixture ratio may be different for each of the banks, that is, the required amount of fuel injection per revolution may vary between the right and left cylinder banks, the fuel injection time $T_i$ must be determined separately for the right cylinder banks and for the left cylinder banks. For this reason, separate control units, such as those used for the in-line cylinder type of engine, are provided for each of the two engine fuel injection control systems. Therefore the cost of these control units is doubled and mass production of the fuel injection control system may become uneconomical.

SUMMARY OF THE INVENTION

In view of the above-described problem, it is an object of the present invention to provide a fuel injection control system using a single control unit for an internal combustion engine having two exhaust manifolds for two (right and left) cylinder banks and two groups of corresponding fuel injectors, and particularly an engine such as a V-8.

According to the present invention, there is provided a fuel injection control system for an internal combustion engine, such as a V-8 engine, comprising a means for calculating a basic amount of injected fuel for each revolution of the engine ($T_p$) for both banks of cylinders on the basis of an intake air flow rate (Q) and engine revolution speed (N), a means for calculating correction coefficients (COEF) on a basis of other engine operating parameters and two other correction coefficients ($\alpha_L$ and $\alpha_R$) on a basis of the air-fuel mixture ratio for each of the two (left and right) banks of cylinders by means of feedback control and for additively combining these values with that of the basic amount of injected fuel ($T_p \times COEF \times \alpha_L$, $T_p \times COEF \times \alpha_R$, $\frac{1}{2} \times T_p \times COEF$) according to the fuel requirement, a means for converting one of these numerical results ($T_i$) into a pulse signal of a corresponding width, a means for driving each of two groups of fuel injectors to open during an interval corresponding to the width of the pulse signal from the pulse converting means, and a means for selectively switching the output pulse signal from the pulse converting means to the driving means according to the fuel requirement so as to open each of the two (left and right) groups of fuel injectors in various operation modes, whereby the fuel injection system can independently control the quantity of injected fuel for the two (left and right) banks of cylinders. Two of the various operation modes are: (a) when the fuel injection rate (Q) exceeds a predetermined value ($Q_o$), the calculating means obtains the numerical result expressed by the equation $T_i = \frac{1}{2} \times T_p \times COEF$ and the switching means provide a signal for the driving means so as to simultaneously open the fuel injectors of each cylinder group in synchronism with one half of the engine speed with an interval corresponding to $T_i = \frac{1}{2} \times T_p \times COEF$ and (b) when Q is less than $Q_o$, the calculating means obtains the numerical result expressed by one of the two equations $T_i = T_p \times COEF \times \alpha_L$ or $T_i = T_p \times COEF \times \alpha_R$ and switching means provides two signals alternatingly to the driving means so as to alternatingly open the fuel injectors of either group in synchronisms with one half of the engine speed, one group of fuel injectors with an interval corresponding to $T_i = T_p \times COEF \times \alpha_L$ and the other group of injectors with an interval corresponding to $T_i = T_p \times COEF \times \alpha_R$.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The features and advantages of the present invention will be fully understood with reference to the drawings where the same reference numerals designate corresponding elements, and in which.

DESCRIPTION OF THE PREFERRED EMBODIMENT

The features and advantages of the present invention will be more clearly understood from the following description with reference to the attached drawings.

Figure 1:
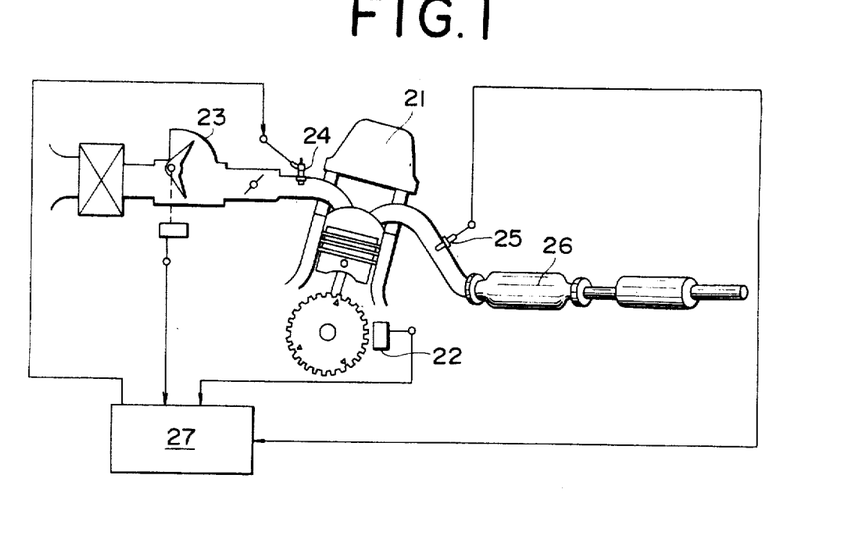
FIG. 1 is a schematic diagram showing a conventional fuel injection control system for use in an internal combustion engine such as an in-line six-cylinder engine.
Figure 2:
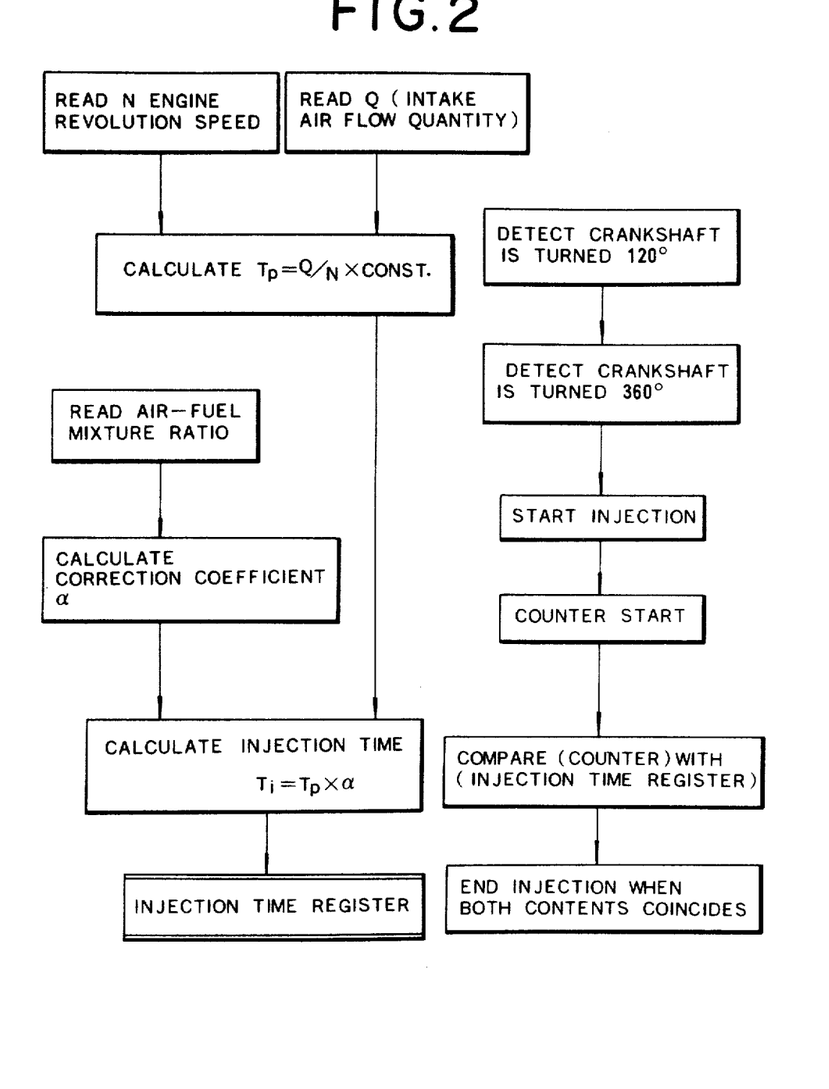
FIG. 2 is a general flowchart of a control unit of the conventional fuel injection control system shown in FIG. 1.

Turning first in FIG. 1 there is depicted a schematic drawing of a conventional fuel injection control system for an internal combustion engine having one bank of cylinders such as an in-line six-cylinder engine. Numeral 21 denotes an engine cylinder, and numeral 22 denotes a crank angle sensor which senses the rotation angle of a disc plate. The disc plate is attached to a crank pulley of the crankshaft, and has "teeth" for example every 4° along the circumferential surface thereof for outputting a pulse signal whose width corresponds to a 1° of rotation angle and has projections, for example every 120° along the same circumferential surface thereof for outputting a pulse signal whose period corresponds to a 120° of rotation angle. Numeral 23 denotes an air-flow meter which measures an intake air flow rate, numeral 24 denotes fuel injectors each of which has an injection valve through which a controlled amount of fuel is injected to the engine cylinder 21. Numeral 25 denotes an exhaust gas sensor, e.g., an oxygen sensor which senses the concentration of oxygen in the exhaust gas in order to obtain the fuel-air ratio of the mixture which has been supplied to the engine cylinder 21. Numeral 26 denotes a three-way catalytic converter for purifying harmful components such as nitrogen oxides ($NO_x$), carbon monoxide (CO), and hydrocarbon (HC) in the exhaust gas from the combustion chamber of the engine cylinder 21, and numeral 27 denotes a control unit which inputs signals from the air flow meter 23, the crank rotation angle sensor 22, and the oxygen sensor 25, and which performs arithmetic operations to determine the amount of fuel to be supplied to the engine cylinder 21 and which outputs a pulse signal whose width is proportional to the result of those arithmetic operations. The fuel injectors 24 are energized by the pulse signal to permit the transmission of fuel therethrough in accordance with the pulse width of the output pulse signal. The control unit 27 comprises a microcomputer which operates in accordance with a flowchart as shown in FIG. 2.

In order to correct the air-fuel mixture ratio in response to a feedback signal from the oxygen sensor 25 to a stoichiometric air-fuel mixture ratio, a correction coefficient $\alpha$ is calculated by which the basic fuel injection rate $T_p$ is multiplied and its result is set into an injection time register.

The start of injection is synchronized with a signal indicating that the crank has rotated through 360° (hereinafter referred to as a 360° signal) which is obtained by dividing a 120° signal obtained from the crank rotation angle sensor 22 (This signal is outputted whenever the crank has rotated through 120°).

A counter starts counting a fixed frequency pulse signal whenever the 360° signal is inputted. The contents of the counter are compared with the contents of the injection time register and when the two values coincide, the injection is stopped.

Therefore, the fuel injection for each revolution is performed for exactly the time interval set in the register.

The electronic engine control system described above is designed to control the fuel injection of in-line engine, for example an in-line six-cylinder engine.

When such a system is applied to a V-type eight cylinder engine having dual exhaust manifolds, for example, separate oxygen sensors 25 need to be provided in each of the exhaust manifolds.

In such a V-8 engine the two banks of cylinders are typically set at an angle to each other. Therefore, different correction values for the air-fuel mixture ratio, or different amounts of fuel injection, are required for left and right cylinder banks. Therefore, the fuel injection amount should be determined independently for each of the cylinder banks. For this reason, in conventional systems two control units, one for each cylinder bank.

However, the provision of two control units is normally expensive and uneconomical from the standpoint of mass production.

A fuel injection control system according to the present invention is now described with reference to FIGS. 3 through 6B.

Figure 3:
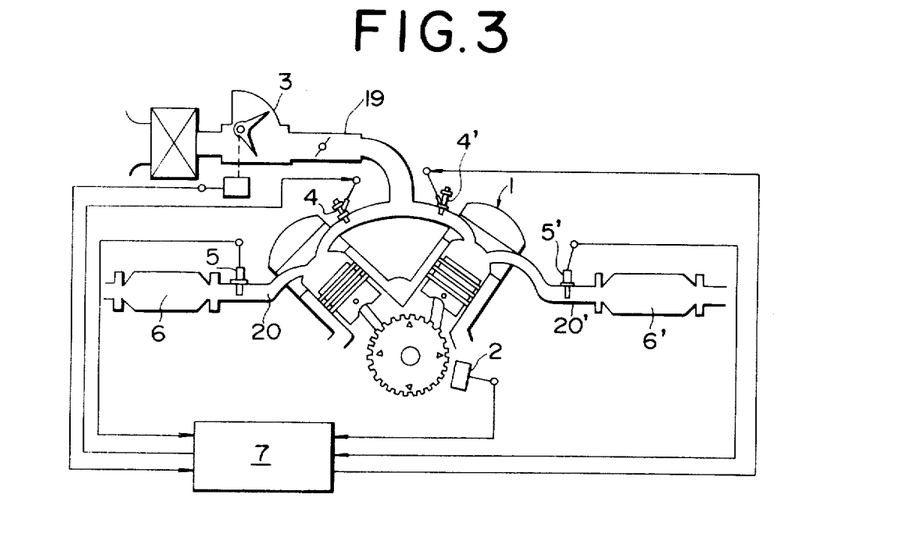
FIG. 3 is a schematic diagram of a fuel injection control system according to the present invention, applied to a V-type engine.

FIG. 3 is a schematic diagram showing a fuel injection control system of a preferred embodiment according to the present invention for a V-8 engine having two exhaust manifolds, one for each of two banks of four cylinders, and two groups of fuel injectors, each group having one fuel injector for each cylinder of the bank.

Such a fuel injection control system can be applied equally to other V-type engines and also to opposed cylinder type engines having two cylinder banks and two exhaust manifolds.

As shown in FIG. 3, numeral 1 denotes a V-8 engine. Numeral 2 denotes a crank rotation angle sensor. The crank angle sensor 2 detects the rotation on the teech and projections of the crank pulley mounted on the crankshaft of the V-8 engine 1 for producing two pulse trains: one pulse of one of the two pulse trains represents a crankshaft rotation of 1° (1° signal) and one pulse of the other pulse train represents a crankshaft rotation of 90° (90° signal), in other words, two of the pistons of the V-8 engine 1 have reached an upper dead point.

By dividing the latter 90° pulse signal from the crank rotation angle sensor 2 by two, a pulse signal representing a crank rotation of 180° (hereinafter referred to as a 180° signal) is generated to serve as a timing signal for the start of injection.

Numeral 3 denotes the air flow meter positioned at upstream of an intake air passage 19 and may include a potentiometer for producing a first signal with a magnitude representing the intake air flow rate determined by an of opening degree of a flap thereof.

Numerals 4 and 4' denote two groups of fuel injectors, each having a variable open interval the (left group of fuel injectors are denominated 4 and right group of fuel injectors 4' as viewed facing the drawing).

Numeral 5 and 5' denote oxygen sensors, located in left and right exhaust manifolds 20 and 20', respectively, each of detects the concentration of oxygen in the exhaust gas from the corresponding bank of cylinders and which produces first and second feedback signals, representing the proportion of fuel to the intake air quantity injected within the cylinders of the corresponding bank when the intake fuel air-ratio is not stoichiometric. Numerals 6 and 6' denote three-way catalytic converters, located at downstream of the left and right exhaust manifolds 20 and 20', respectively, for reducing noxious components $NO_x$, CO, and HC in the exhaust gas when the air-fuel mixture ratio to each cylinder bank is maintained at a stoichiometric ratio.

Numeral 7 denotes a control unit. The control unit 7 inputs signals representing various engine operating parameters, converts them into numerical values, representing nonlinear functions of the engine fuel requirement, and outputs a pulse signal having a width corresponding to a required amount of fuel per engine revolution, to the fuel injectors of each group 4 and 4'.

Basically the control unit 7 calculates the fuel injection amount (Q/N×Constant) required during each revolution of the engine from an engine speed signal N obtained through the crank angle sensor 2 and intake air flow rate Q obtained through the intake air flow meter 3. Furthermore, in order to promote more effective reactions in the three-way catalytic converters 6, and 6' more effectively the output signals (the first and second feedback signals) from both oxygen sensors 5 and 5' are fed back into the control unit 7 where the basic fuel injection rate (Q/N×Constant) is further multiplied by one of the correction coefficients ($a_L$ or $a_R$) obtained on a basis of the first and second feedback signals to thereby correct the current air-fuel mixture ratio to approach a stoichiometric air-fuel mixture ratio in addition, other correction coefficients (COEF) obtained from other various engine operating parameters, e.g., cooling water temperature are used.

Figure 4:
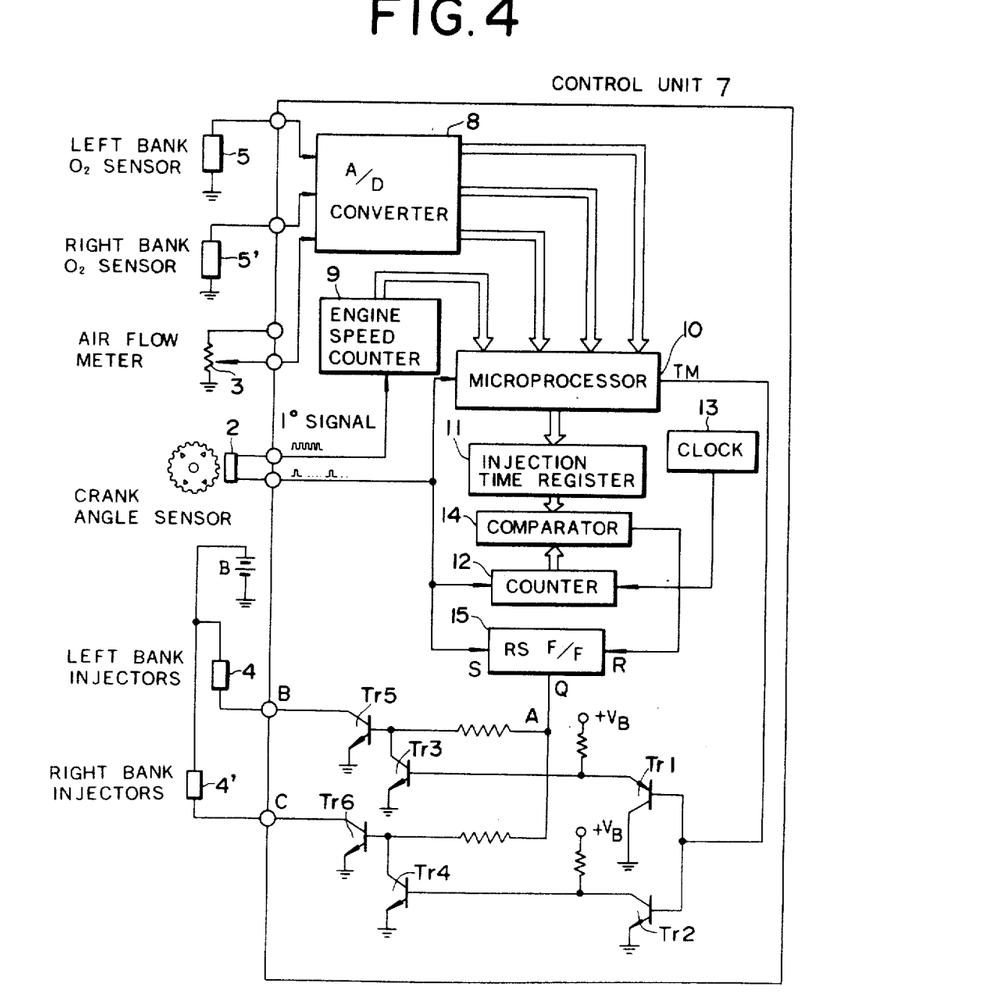
FIG. 4 is a schematic block diagram of a control unit of the fuel injection control system according to the present invention.

FIG. 4 illustrates a block diagram of a preferred embodiment in accordance to the present invention of a fuel injection control system for a V-8 engine 1.

In FIG. 4, numeral 8 denotes an analog-to-digital converter (hereinafter referred simply to as A/D converter). The A/D converter 8 converts analog input signals from the various sensing means, each of which has a magnitude representing one of various engine operating parameters into corresponding numerical values in digital form. The intake air flow rate (Q), the first and second feedback signals representing the deviation from a stoichiometric air-fuel mixture ratio (rich or lean) outputted by left and right oxygen sensors 5 and 5' may be converted to digital signals in the converter 8.

Numeral 9 denotes an engine speed counter which counts the number of 1° signals from the crank angle sensor 2 for a fixed interval of time determined by the open interval of a gate provided therein for producing a signal with a numerical value representing the number of engine revolutions (N) per time (rpm) (hereinafter second signal).

Numeral 10 denotes a microprocessor which performs arithmetic operations to obtain the fuel injection rate on the basis of the digital input signals; that is, counted pulses representing the number of revolutions per regular time interval (engine speed) (N), intake air flow rate (Q), and additively combining correction coefficients derived from, the air-fuel mixture ratio of each of the two engine cylinder banks.

Numeral 11 denotes an injection time register which temporarily stores the numerical result representing a fuel injection amount per one or one half engine revolution as calculated by the microprocessor 10.

Numeral 12 denotes a counter which counts regular pulses generated by a clock generator 13. Numeral 14 denotes a comparator which compares the value of the injection time register 11 with that of the counter 12, and numeral 15 denotes a set-reset flip-flop (or, simply RS F/F) operated by the output from the comparator 14. The injection time register 11, comparator 14, counter 12, and RS flip-flop 15 constitute a pulse converting circuit. The microprocessor 10 inputs the following signals: the second signal representing engine revolution speed (N) per time obtained from the crank angle sensor 2, the first signal representing intake air flow rate (Q) obtained from the intake air-flow meter 3 via the A/D converter 8, the first and second feedback signals according to air-fuel mixture ratio from the oxygen sensors 5 and 5' via the A/D converter 8, and so on.

Figure 5:
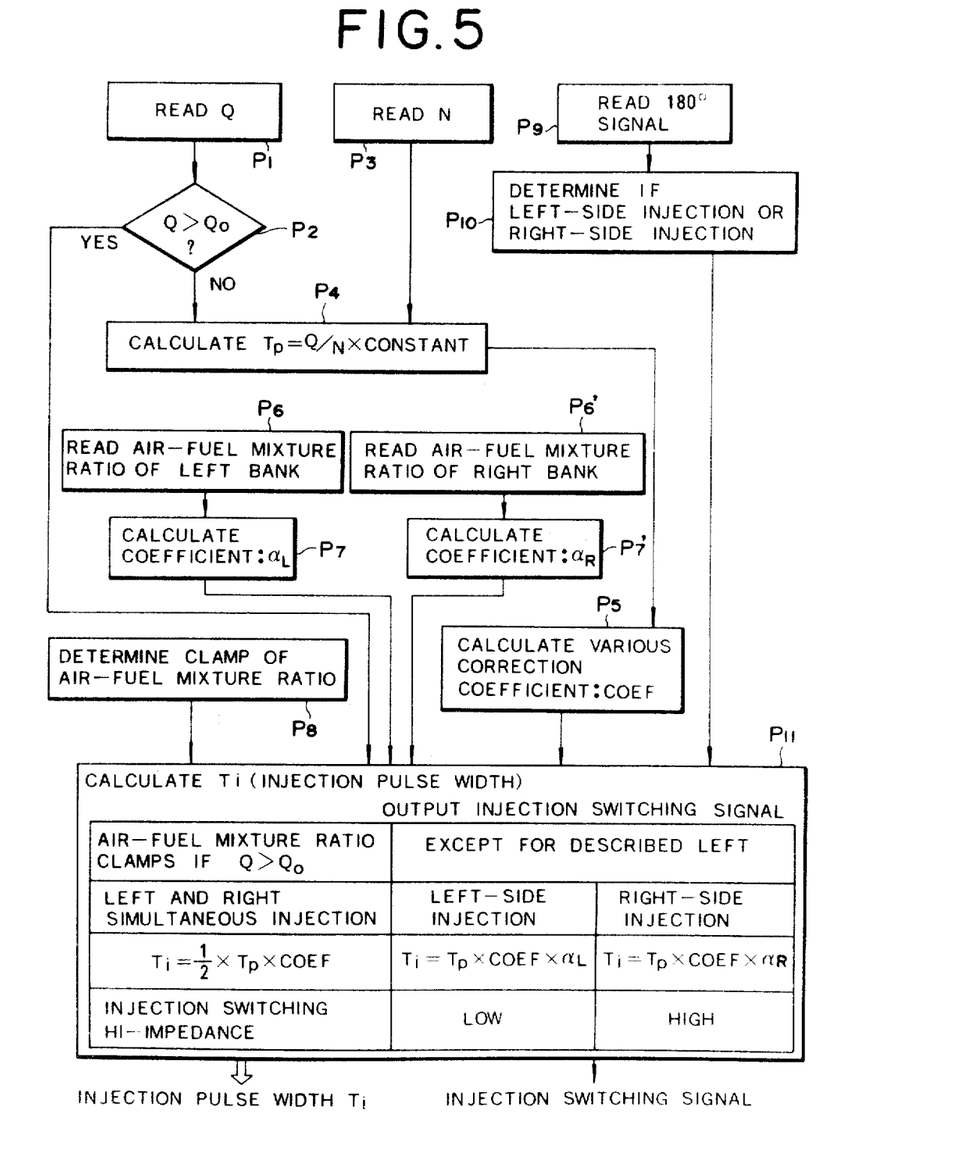
FIG. 5 is a flowchart of a fuel injection control system of the present invention showing arithmetic operations to calculate and output an fuel injection pulse and injection switching pulse.

The microprocessor 10 performs arithmetic operations in a sequence as described in the flowchart of FIG. 5.

In FIG. 5, in step $P_1$ the microprocessor 10 reads in the intake air flow rate Q. In step $P_2$ the microprocessor 10 compares the value Q with a predetermined value $Q_0$ corresponding to a predetermined intake air flow rate to check if the V-8 engine 1 is in a high load condition.

In step $P_3$, the microprocessor 10 reads in the current value of the engine speed (N) from the engine speed counter 9.

In step $P_4$, the microprocessor 10 performs arithmetic operations of the amount of basic fuel injection required for each engine revolution ($T_p$). In step $P_5$, various correction coefficients (COEF) are calculated to adjust the basic fuel injection rate ($T_p$) in accordance with other engine operating parameters (e.g., cooling water temperature in a water outlet, intake air temperature, etc.) In steps $P_6$ and $P_6'$, the microprocessor 10 reads in the numerical values of the first and second feedback signals responsive to the air-fuel mixture ratio for each of the left and right cylinder banks. In step $P_7$ and step $P_7'$, the microprocessor 10 calculates each of the mixture fuel correction coefficients $\alpha_L$ and $\alpha_R$, on a basis of the corresponding air-fuel mixture ratio. When the V-8 engine 1 is operating in such states as high speed or under high load and also while the engine 1 has not yet warmed up after starting, the air-fuel mixture ratio is required to be lower than a stoichiometric air-fuel mixture ratio (i.e. a richer mixture fuel is used).

In such situations, the microprocessor 10 does not perform the correction of the basic fuel injection pulse width $T_p$ by the correction values $\alpha_L$ and $\alpha_R$ in such an equation as: $\{T_p \times COEF \times (\alpha_L \text{ or } \alpha_R)\}$. Therefore, in step $P_8$ the microprocessor 10 determines whether the correction by the correction values $\alpha_L$ and $\alpha_R$ should be carried out or not.

In step $P_9$, the microprocessor 10 inputs a pulse signal representing whether the crankshaft has rotated through 180° (hereinafter referred simply to as a 180° signal) the 180° signal representing whether the engine has rotated through one half of an engine revolution. In step $P_{10}$, the microprocessor 10 determines determines whether the next fuel injection is for the left or right cylinder bank.

In step $P_{11}$, the microprocessor 10 calculates the injection pulse width $T_i$ from the calculated basic injection pulse width $T_p$, $T_i$ representing an interval of time during which the fuel injectors of each group are opened in synchronism with the 180° signal, and outputs one of three signals (tri-state logic) indicating that the fuel to be injected to either injectors 4 or 4' or to both groups of injectors 4 and 4', as the case may be. In the region where the value of Q is found to be greater than that of $Q_o$ in the step $P_2$, the air-fuel mixture ratio is not considered and feedback control is suspended.

At this time, to cope with the requirement of increasing engine load, the control unit 7 calculates the injection pulse width $T_i$ so as to open both groups of fuel injectors 4 and 4' in synchronism with the 180° signal, while the state of the switching signal is set to a high-impedance, as described below.

In the region where the value of Q is lower than the value of $Q_o$, feedback control of the air-fuel mixture ratio is performed for the left and right group fuel injectors 4 and 4' independently of each other and on the basis of the first and second feedback signals from the respective oxygen sensors 5 and 5'.

Therefore, the injection pulse width $T_i$ is calculated independently for the left and right groups of fuel injectors 4 and 4' $T_i$ for the left group of fuel injectors 4 is combined with a correction coefficient value $\alpha_L$ calculated from the first feedback signal of the left oxygen sensor 5, and $T_i$ for the right group of fuel injectors 4' is combined with correction coefficient value $\alpha_R$ calculated from the second feedback signal of the right oxygen sensor 5'. The microprocessor 10 outputs two states of the switching signals in synchronism with the 180° signal to the fuel injector driving means (the driving means comprises a DC power supply B and transistors Tr5 and Tr6 for the left or right group of fuel injectors respectively) so as to alternatigly open the left and right group fuel injectors 4 and 4'.

Since the injection pulse width $T_i$ calculated from the microprocessor 10 is in a digital form, this data $T_i$ is converted to a corresponding actual pulse width of a constant amplitude by means of the injection time register 11, counter 12, clock 13, comparator 14, and R/S flip-flop 15 which constitute a pulse converting means as shown in FIG. 4.

The relation between these signals will now be described with further reference to the timing charts of FIG. 6A and FIG. 6B.

The counter 12 is reset to zero and starts counting every time the 180° signal produced from the crank rotation angle sensor 2 is inputted.

Simultaneously, the flip-flop 15 is set by the 180° signal at point A, and the Q terminal of the flip-flop 15 goes high to start the fuel injection.

When the counter 12 arrives at the numerical value stored in the injection time register 11, a trigger pulse signal is fed from the comparator 14 to the R terminal of the R/S flip-flop 15 to reset the R/S F/F 15.

Then the potential at point A goes low, and transistors Tr5 and Tr6 which constitute the driving means of the left and right group of fuel injectors 4 and 4' respectively are cut off to end the fuel injection.

Thus, an actual fuel injection pulse is created with a width corresponding to the numerical value $T_i$ obtained by the microprocessor 10.

An output terminal TM of the microprocessor 10 is connected to transistors Tr1 and Tr2 shown in FIG. 4 and provides one of the tri-state logic level signals: high level, low level, or high-impedance level signal (input impedance of the transistors Tr1 and Tr2 is substantially infinite).

Transistors Tr1 through Tr6 change their switching states as in the following table according to the tri-state logic level of the output terminal TM.

TABLE

| Injection switching signal (TM) | Low (0V) | High (5V) | High impedance |
|---|---|---|---|
| Tr 1 | ON | OFF | ON |
| Tr 2 | OFF | ON | ON |
| Tr 3 | OFF | ON | OFF |
| Tr 4 | ON | OFF | OFF |
| Tr 5 | ON according to potential A | OFF regardless of potential A | ON according to potential A |
| Tr 6 | OFF regardless of potential A | ON according to potential A | ON according to potential A |
| Fuel injector | left group only | right group only | both |

As shown in FIG. 4, since transistors Tr1 and Tr2 have different polarities; that is, Tr1 is PNP and Tr2 is NPN, the transistors Tr1 and Tr2 present different switching states (ON/OFF) from each other when the output terminal TM of the microprocessor 10 described above is turned to a high level or low level.

However, in a high impedance state, the output terminal TM of the microprocessor 10 is turned to, the so called, current interrupted state, so that the transistor Tr1 at first turns on and the base potential of transistor Tr2 rises to turn on.

In this way, depending on the potential of point A and the state (high level, low level or high impedance) of the tri-state switching signal, the potential of points B and C in FIG. 4 is set low (provided that the point A is at a high level), and fuel injection via the left or right group of the fuel injectors 4 or 4' is performed during the low-level potential of point B or C, respectively.

Figure 6A:
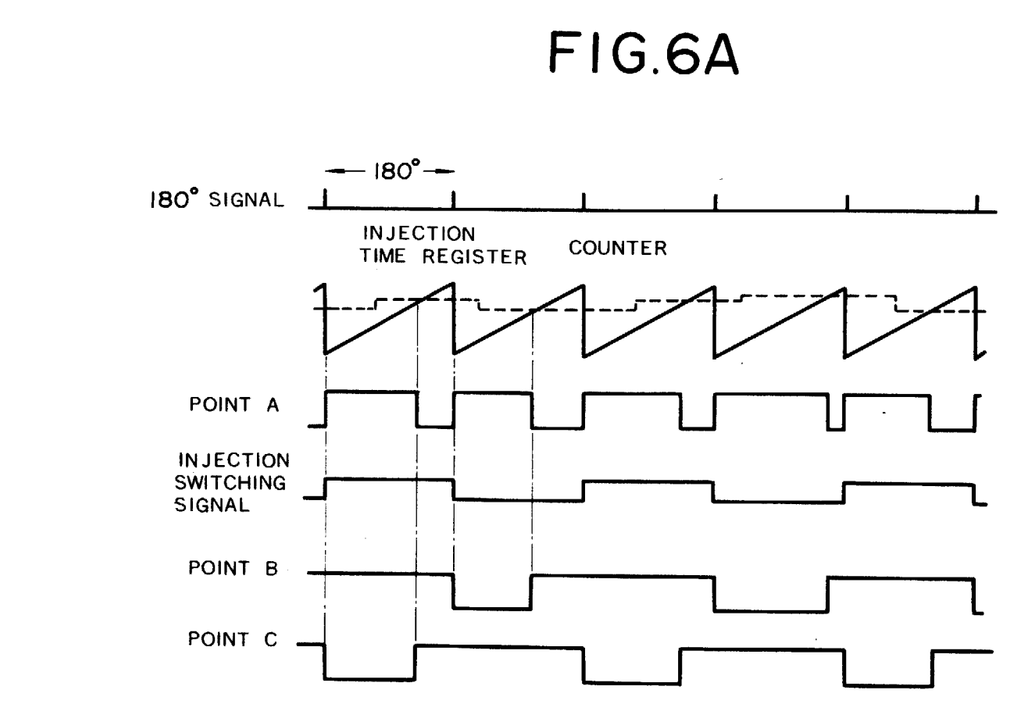
FIGS. 6A and 6B are signal timing charts of a fuel injection control system according to the present invention shown in FIG. 3.

As apparent in FIG. 6A, while the left or right group of fuel injectors 4 and 4' are performing fuel injection corresponding to $T_i$ alternatingly, each group of the fuel injectors 4 and 4' can supply fuel for a maximum of 180° (one half of engine revolution) of each 360° rotation of the crankshaft. Therefore if the maximum rate of fuel injection for each group of fuel injectors 4 and 4' is represented by t, then the maximum average injection rate for each engine rotation is t/2.

Since the fuel injection amount for one engine revolution is approximately obtained by the expression $Q/N \times$ Constant, the fuel injection amount per unit time is approximately $Q/N \times$ Constant $\times N$ or $Q \times$ Constant.

The maximum average injection rate t/2 or $Q \times$ Constant is hereinafter denoted by the expression: $Q_o$. It should be understood that the alternating mode of fuel injection cannot supply sufficient fuel when the current intake air flow rate Q exceeds $Q_o$.

It is undesireable to solve this problem by increasing the maximum capacity of the fuel injectors of each group 4 and 4', is (i.e., increasing in the fuel injection rate from each fuel injector) because such a solution tends to reduce the control accuracy of the fuel injection.

When the intake air flow rate Q is high, so open loop control is usually performed with the air-fuel mixture ratio control fixed. According to the present invention, when the intake air flow rate Q is more than $Q_o$, the air-fuel mixture ratio control is suspended and each group of fuel injector 4 or 4' injects half of the amount required for one revolution twice during each engine revolution ($T_i = \frac{1}{2} \times T_p \times$ COEF).

Therefore, when $Q > Q_o$, the tri-state switching signal from the microprocessor 10 is changed to a high impedance state.

Figure 6B:
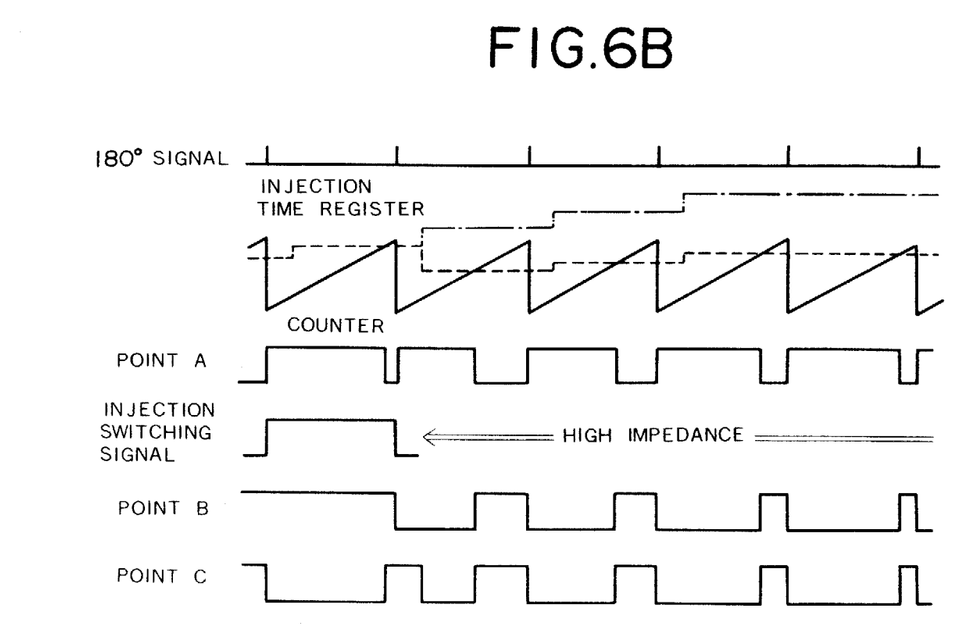

The signal timing chart in the case where $Q > Q_o$ is shown in FIG. 6B. Transistors Tr5 and Tr6 in FIG. 4 operate simultaneously according to the signal level of point A and the left and right group of fuel injectors 4 and 4' are operated simultaneously, once for every 180° rotation of the crankshaft (one half of engine revolution).

In this way when fuel is supplied to the engine with the mixture richer than a stoichiometric air-fuel mixture ratio in order to make the engine rotate at high speed under high load, to make it warm up, or with the oxygen sensors 5 and 5' in cool inactive state, the feedback control of the air-fuel mixture ratio is not performed.

In this case, since independent injection by the right and left groups of fuel injectors 4 and 4' is not required, both right and left groups of fuel injectors 4 and 4' inject half of the injected amount required for one rotation expressed by $T_i = \frac{1}{2} \times T_p \times$ COEF every 180° signal of the rotation angle of the crankshaft (one half of engine revolution).

Thus according to the present invention, there is provided a fuel injection control system for an internal combustion engine having two (left and right) banks of cylinders, two (left and right) groups of fuel injectors, each cylinder having a corresponding fuel injector with a variable open interval, and two exhaust manifolds, such as the V-8 engine in the preferred embodiment described hereinbefore. Such fuel injection control system comprises: (1) the air flow meter 3 and A/D converter 8 constituting a first sensing means for producing a first signal with a numerical value representing an intake air flow rate (Q); (2) the crank rotation angle sensor 2 and engine speed counter constituting a second sensing means for producing a second signal with a numerical value representing the number of engine rotation per time (N); (3) the microprocessor 10 constituting a first and second calculating means and selectively switching means, the first calculating means obtaining a basic amount of fuel $T_p$ for one engine rotation, the second calculating means obtaining correction coefficients COEF, $\alpha_L$ and $\alpha_R$ to additively combine the coefficients COEF and either of $\alpha_L$ and $\alpha_R$ with the basic fuel injection rate $T_p$ according to the engine fuel requirement, the microprocessor and the selectively switching means providing one of a tri-state signal (high, low, or high-impedance) to a group of transistors Tr1, Tr2, Tr3, and Tr4 according to the engine fuel requirements so as to open either one or both of the two groups of fuel injectors 4 and 4'; (4) the injection time register 11, counter 12, clock 13, comparator 14, and R/S flip-flop 15 constituting a pulse converting means whose output pulse width corresponds to one of the three modes of $T_i (T_i = \frac{1}{2} \times T_p \times$ COEF, $T_i = T_p \times$ COEF $\times \alpha_L$, $T_i = T_p \times$ COEF $\times \alpha_R$); (5) two transistors Tr1 and Tr2 constituting a driving means for driving each of left and right groups of fuel injectors respectively. Therefore, the control unit 7 is of such construction that it mass-produced inexpensively and compactly in the same way as the control units used in in-line type engines.

It will be fully understood by those skilled in the art that modifications may be made in the preferred embodiment described hereinafter without departing the spirit and scope of the present invention, which is to be defined in the following claims.

What is claimed is:

1. A fuel injection control system for an internal combustion engine having two banks of cylinders, a fuel injector located at an intake of each cylinder, and an exhaust manifold for each bank of cylinders having a catalytic converter positioned therein, said system comprising:

(a) a first circuit for calculating a pulse width representing an amount of fuel to be injected into the engine in synchronism with engine speed on a basis of two input signals, one signal representing an intake air flow rate and the other signal representing the instantaneous engine revolution speed, and for producing a signal corresponding to one of tri-state logic signals depending upon whether the intake air flow rate exceeds a predetermined value to thereby enable the fuel injectors of both banks of engine cylinders to be simultaneously actuated or for the fuel injectors of either bank of cylinders to be alternatingly actuated;

(b) a second circuit for converting the calculated result from said first circuit into an actual pulse of a corresponding width;

(c) a driving circuit for operating the fuel injectors of both banks of cylinders simultaneously or for operating the fuel injectors of each bank of cylinders alternatingly during an interval of time corresponding to the pulse width of the pulse signal from said second circuit depending on the state of said tristate logic signals from said first circuit; and (d) a third circuit for actuating said driving circuit according to the level of the tri-state logic signal fed from said first circuit.

2. A fuel injection control system as set forth in claim 1, wherein said first circuit performs independent arithmetic calculations of the pulse width representing an amount of fuel to be injected into the two cylinder banks during each engine revolution, when said intake and flow rate does not exceed said predetermined value said calculations include consideration of separate correction values derived from two feedback signals representing a deviation of an intake air-fuel mixture ratio from that of a stoichiometric ratio, said feedback signals being obtained from oxygen sensors provided in each of the exhaust manifolds.

3. A fuel injection control system as set forth in claim 2, wherein said third circuit sends one of two logic output signals every half engine revolution to said driving circuit to alternatingly drive, during every half engine revolutions one of the two groups of fuel injectors according to the level of the tri-state signal fed from said first circuit.

4. A fuel injection control system as set forth in claim 1, wherein, when the intake air flow rate exceeds the predetermined value, said first circuit performs arithmetic calculations of the pulse width representing an amount of fuel to be injected into the two cylinder banks per engine revolution without consideration of correction values derived from two air-fuel mixture ratio signals generated from oxygen sensors provided in each of said exhaust manifolds.

5. A fuel injection control system as set forth in claim 4, wherein said first circuit performs arithmetic calculations of the pulse width representing a fuel amount to be injected into the two cylinder banks with feedback control from the oxygen sensors suspended.

6. A fuel control system as set forth in claim 4, wherein said third signal outputs a signal every half revolution to said driving circuit to simultaneously drive the fuel injectors of both groups of cylinders.

7. A fuel injection control system as set forth in claim 1, wherein said first circuit comprises a microprocessor and said second circuit comprises:
    (a) a fuel injection time register for storing the numerical result calculated by said microprocessor;
    (b) a clock generator generating pulses at a regular time interval;
    (c) a counter, operable to be reset to zero by a signal from the crank angle sensor indicating that the crankshaft has rotated through 180°, for counting the number of pulses from said clock generator;
    (d) a comparator connected to said fuel injection time register and counter for comparing the contents of said fuel injection time register with the contents of said counter and outputting a signal when the values coincide; and
    (e) a set/reset flip-flop set by the crank angle sensor signal and reset by the output signal from said comparator, whereby the set/reset flip-flop terminal is turned to a high level during the set time.

8. A fuel injection control system as set forth in claim 1 or 7, wherein said first circuit comprises a microprocessor, and said driving circuit comprises fifth and sixth transistors both bases of which are connected to said second circuit via resistors, each collector of which is connected through a corresponding group of fuel injectors to a DC power supply, and both emitters of which are grounded, said third circuit further comprising four transistors, wherein the bases of a first transistor and a second transistor of said four transistors are of different polarity and are connected to an output terminal of said microprocessor, and the collector of the first transistor and the emitter of the second transistor are grounded, and the emitter of the first transistor is connected to the base of a third transistor of said four transistors and via a resistor to the power supply, and the collector of said second transistor is connected to the base of a fourth transistor of said four transistors and via a resistor to the power supply, and the collector of said third transistor is connected to the base of said fifth transistor, and the collector of said fourth transistor is connected to the base of said sixth transistor, and the emitters of said third and fourth transistors grounded, whereby said fifth and sixth transistors of said driving circuit are turned on independently of each other according to one of the output tri-state logic signals from said microcomputer.

9. A fuel injection control system as set forth in claim 1, wherein said first circuit calculates correction coefficients and is operable to combine numerical values of said coefficients with the pulse width representing the amount of injected fuel into the engine on a basis of input signals representing various engine operating parameters.

10. A fuel injection control system for an internal combustion engine having two banks of cylinders, two groups of fuel injectors, each group having fuel injectors equal in number to the cylinders of the corresponding bank, and each fuel injector having a variable open interval, and two exhaust manifolds each provided at the corresponding bank of cylinders, comprising:
    (a) a first sensing means for producing a first signal with a numerical value representing an engine operating parameter, the numerical value of the first signal being a nonlinear function of the engine fuel requirement;
    (b) a second sensing means for producing a second signal with a numerical value representing another engine operating parameter, the numerical value of the second signal being a nonlinear function of the engine fuel requirement;
    (c) a first calculating means for arithmetically operating on the numerical values of the first and second signals from said first and second sensing means respectively so as to calculate a basic amount of fuel to be injected per engine revolution from the fuel injectors of each group;
    (d) A second calculating means for arithmetically operating on numerical values of other sensed signals, the numerical values of the other sensed signals representing various engine operating parameters other than those of the first and second signals so as to calculate correction coefficients to correct the numerical result of said first calculating means and for additively combining correction coefficients according to the fuel requirement with the numerical result from said first calculating means;
    (e) a means for converting the numerical result from said first calculating means additively combined with the numerical result from said second calculating means into a first pulse signal having a width corresponding to a combination of said numerical results;
    (f) a means for driving the fuel injectors of each group to open to inject a required amount of fuel to respective cylinders during an interval of time corresponding to the width of the first pulse signal outputted from said pulse converting means; and (g) a means for selectively switching the first pulse signal outputted from said pulse converting means to said driving means according to a numerical result from said second calculating means so as to open either of the two groups of the fuel injectors alternatingly or simultaneously in synchronism with one half of an engine revolution.

11. A fuel injection control system for an internal combustion engine as set forth in claim 10, wherein said first sensing means comprises means for producing a first signal with an amplitude representing an intake air flow rate and means for converting the amplitude of the first signal into a corresponding numerical value.

12. A fuel injection control system for an internal combustion engine as set forth in claim 11, wherein said second sensing means comprises means for producing a second signal with a numerical value representing a number of engine revolutions in a fixed interval of time.

13. A fuel injection control system for an internal combustion engine as set forth in claim 10, which further comprises a third sensing means for producing a second pulse signal representing an engine rotation of one half of a revolution.

14. A fuel injection control system as set forth in claim 13, wherein the second pulse signal from said third sensing means is fed to said first and second calculating means and pulse converting means, to operate in synchronism therewith.

15. A fuel injection control system as set forth in claim 13 or 14, wherein the second signal and second pulse signal from said second and third sensing means are derived from a crank angle sensor which generates two pulse trains; one pulse of one pulse train representing an engine rotation through an angle of one degree and one pulse of the other pulse train representing either of two pistons of the engine having reached an upper dead point, the one pulse train being fed to said second sensing means so as to generate the second signal and the other pulse train being fed to said third sensing means through a frequency dividing means so as to generate the second pulse signal.

16. A fuel injection control system for an internal combustion engine as set forth in claim 13, wherein said pulse converting means comprises:

(a) a register which stores numerical data representing the calculated result from said first calculating means combined with the correction coefficients derived from said second calculating means;

(b) a clock for generating clock pulses at every fixed interval of time;

(c) a counter operable to be reset to zero by the second pulse signal from said third sensing means for counting the number of clock pulses from said clock;

(d) a comparator connected to said register and counter for comparing the contents of said register and counter and for outputting a trigger pulse when the contents of said counter coincides with that of said register; and (e) a set/reset flip-flop having a set terminal connected to said third sensing means and reset terminal to the output terminal of said comparator, and being set whenever the third signal is inputted from said third sensing means and reset whenever the trigger pulse is inputted from said comparator so that a pulse signal is produced whose width corresponds to an interval between set and reset time.

17. A fuel injection control system for an internal combustion engine as set forth in claim 10, wherein said driving means comprises two transistors each connected to a corresponding group of fuel injectors through a DC power supply and each of said two transistors having a base connected to said pulse converting means via a first or second resistor and to said switching means, wherein said switching means produces a signal corresponding to one state of a tri-state signal in synchronism with one half of an engine revolution to drive each of said two transistors.

18. A fuel injection control system for an internal combustion engine as set forth in claim 17, wherein said switching means comprises a microprocessor and four transistors including a first transistor and second transistor each of different polarity, said first and second transistors having bases connected to said microprocessor, a collector of said first transistor and an emitter of said second transistor being grounded, and an emitter of said first transistor being connected to a base of a fourth transistor and the power supply via a resistor, a third and said fourth transistors having collectors connected respectively to the bases of said two transistors constituting said driving means, and having grounded emitters.

19. A fuel injection control system for an internal combustion engine as set forth in claim 10, wherein said second calculating means comprises a fourth sensing means for producing a fourth signal with a numerical value representing a cooling water temperature of a water outlet in the engine to thereby calculate one of the correction coefficients to be combined with the numerical result from said first calculating means.

20. A fuel injection control system for an internal combustion engine as set forth in claim 19, wherein said second calculating means further comprises fifth and sixth sensing means, each positioned in one of the two exhaust manifolds, for producing first and second feedback signals each representing the proportion of fuel to intake air flow quantity in a mixture supplied to the cylinders of the corresponding bank and for indicating when said mixture does not have a stoichiometric ratio and a third calculating means for arithmetically operating on the numerical values from said fifth and sixth sensing means so as to calculate corresponding correction coefficients and to combine said coefficients with the fourth signal of the fourth sensing means.

21. A fuel injection control system for an internal combustion engine as set forth in claim 20, wherein said switching means is operable to produce a high or low level signal to said driving means alternatingly in synchronism with one half of an engine revolution, the level of the signal from said switching means being in accordance with either one of the correction coefficients derived from said fifth and sixth sensing means combined with the correction coefficient from the fourth signal of said fourth sensing means when the numerical value of the first signal from said first sensing means does not exceed a predetermined value.

22. A fuel injection control system for an internal combustion engine as set forth in claim 20, wherein said switching means produces a high impedance signal to said driving means in synchronization with one half of an engine revolution when the numerical value of the first signal from said first sensing means exceeds a predetermined value so as to simultaneously open the fuel injectors of both groups.

23. A fuel injection control system for an internal combustion engine as set forth in claim 22, wherein said second calculating means arithmetically calculates half of the numerical values of the correction coefficient without consideration of the numerical values of the correction coefficients calculated from the first and second feedback signals of said fifth and sixth sensing means.

* * * * *